Patented Sept. 7, 1943

2,328,554

UNITED STATES PATENT OFFICE 2,328,554

POROUS EXPANDED CITRUS FRUIT PRODUCTS

Wilbert A. Heyman, New York, N. Y., assignor to Granular Foods, Inc., New York, N. Y., a corporation of Indiana No Drawing. Application March 25, 1941, Serial No. 385,077

12 Claims. (Cl. 99—204)

My invention relates to a novel combination of the citrus fruits and corn syrup and the process of making the same, and more particularly my invention relates to a novel readily soluble powder mixture of whole fruits, such as lemon, pineapple, etc., and corn syrup and the process of making the same.

It has been suggested in the prior art that fruit juices such as lemon juice be combined with corn syrup and then dehydrated to form a powder such as by a drying process, but such products are deficient in the fine natural flavor of lemons and the foods and drinks prepared from such lemon juice corn syrup powder have failed to receive the widespread approval of the public.

I have devised a novel powder comprising a mixture of whole lemons and corn syrup in contradistinction to lemon juice, or essential oils of lemons in corn syrup and my product is characterized by extremely fine and natural flavor that is transmitted to the food products and drinks which may be produced from the product of my invention.

As will be more specifically described hereinafter I form the product of my invention by grinding the complete lemon, extracting only the deleterious seeds and stems. The ground lemon including the skin, is then mixed with corn syrup and formed into a powder by boiling the corn syrup under high vacuum until the water vapor bubbles forming in the gradually solidifying mixture expand the mass and finally burst into one another to form an expanded intercommunicating cell structure which is thoroughly dehydrated by continued heat and vacuum. The dehydrated and expanded mass is then broken down and ground to particle or powder size as desired.

The corn syrup, which is a starch conversion product consisting largely of dextrin, has the very desirable property of preserving and retaining the fine aromatic principles and delicate flavoring constituents of the lemon including the ground up lemon solids of pulp and skin.

An important advantage of the particular process of my invention and the product thereof lies in the fact that during the vacuum drying process that I employ, the terpenes of the oil of the lemon are distilled off with the moisture by the heat and vacuum applied. Inasmuch as it is these terpenes which have previously caused lemon products to become rancid and stale, my novel lemon powder is devoid of the deleterious influence of the terpene and accordingly has and retains the fine flavor of the lemon.

An additional feature of the product of my invention lies in the fact that the pectin of the lemon is included in my product by reason of the fact that the lemon solids themselves are included and it is this pectin which renders my product especially valuable in the manufacture of ice cream, sherbets and carbonated beverages.

Although I shall specifically describe my invention with regard to the citrus fruit lemon in combination with corn syrup, it is to be understood that my invention is equally applicable to other fruits, specifically such citrus fruits as orange, grapefruit, and my invention is primarily concerned with the comminuting of the fruit solids including pulp and, if desired, the peel and preserving and retaining such fruit solids by admixture with corn syrup and conversion of such mixture to a solid expanded form.

In the case of pineapple, the rough outer skin is removed and the pulp comminuted and admixed with corn syrup to form a new and unusual pineapple product in granular form having exceptional flavor.

I also have devised a novel powder made from a mix of lemon or other citrus fruit juice and corn syrup which has been expanded and dehydrated.

It is the object of my invention, accordingly, to provide a novel solid combination of a fruit and corn syrup.

It is a further object of my invention to provide a novel powder comprising a comminuted fruit and corn syrup which has been dehydrated and converted to powder form.

It is a further object of my invention to provide a novel lemon powder comprising comminuted lemon admixed with corn syrup.

It is a further object of my invention to provide a process for producing a novel lemon powder which comprises comminuting an entire lemon to particle size, mixing the comminuted lemon with corn syrup, expanding and dehydrating the mixture of lemon and corn syrup and converting the expanded mass to powder form.

It is a further object of my invention to provide a novel powder comprising a mixture of citrus fruits solids and corn syrup.

It is a further object of my invention to provide a novel granular form of a solid mix of pineapple and corn syrup.

It is a further object of my invention to provide an improved solid form of lemon powder by incorporating with the lemon juice, cold pressed lemon oil with or without the terpene component, the lemon oil being added either before expansion of the corn syrup-lemon juice mix or after the expansion of the mixture and before reducing to particle form.

These and further objects of my invention will be apparent from a consideration of the specific description of my invention which here follows.

I take, for example, 360 lemons, which constitute a crate, and I cut these lemons to remove therefrom the stems and pits, I grind the destemmed and depitted lemons including skin, pulp and juice in a grinder, similar in mechanical action to a meat grinder. The lemons are thoroughly comminuted to particle size and the resultant comminuted mass, resulting from the grinding of 360 lemons is mixed with 104 pounds of corn syrup which has been previously diluted with two gallons of warm water. The corn syrup is diluted to facilitate the homogeneous mixing of the comminuted lemon with the corn syrup.

The comminuted lemon and corn syrup are then thoroughly mixed until a homogeneous liquid mix is obtained.

This mixture is then dehydrated, for example, by pouring into trays until a thin layer of the order of 3/16 of an inch is deposited on the bottom of the tray, whereupon the tray is placed in a vacuum dryer and sufficient heat applied to cause the corn syrup-lemon mixture to boil under a vacuum of 29 to 30 inches of mercury, which is applied thereto.

The boiling is continued, the water vapor contained in the mix being gradually driven off until the mixture thickens and until the water vapor bubbles developed within the mixture are trapped therein and expanded by reason of the applied heat and vacuum. The developing and expanding water vapor bubbles effect the formation of an expanded semi-solid mass. The expansion under high vacuum and heat is continued until the bubbles are caused to break into one another and to break at the surface to cause formation of an intercommunicating cell structure which is sponge-like in form and to this intercommunicating cell structure is applied a continued heat and high vacuum so that substantially all moisture contained within the mass is driven off and extracted by the heat and vacuum, and thorough dehydration is effected.

When the mass is thoroughly dehydrated and set in solid intercommunicating cell structure form, the heat and vacuum are shut off and the mass is then broken down and sieved or ground to particle and powder form in accordance with the product desired.

For further explanation of this expansion dehydration process, see my copending application Serial No. 351,266, filed August 3, 1940, of which this is a continuation-in-part.

From the admixture of 360 lemons with 104 pounds of corn syrup, I obtain 105 pounds of a powder comprising a mix of lemon and starch conversion solids. This 105 pounds of lemon powder contains substantially twenty-one per cent of lemon solids.

As another specific example of the process of my invention I quarter 62 pounds of seedless lemons and remove the stems therefrom. I grind the stemless lemons in a comminuting machine mechanically similar to a meat grinder and mix the resultant comminuted lemons with 32 pounds of corn syrup which has been diluted with one quart of warm water. This mixture is then expanded, dehydrated and pulverized as set forth above and in my co-pending applications Serial Nos. 351,265 and 351,266 and from this mix I obtain 36 pounds of lemon powder. The powder obtained from the proportions set forth in this example contains 42% of lemon solids.

In both of the examples above set forth I find that the lemon terpenes have been distilled off during the vacuum drying and accordingly the products are substantially terpeneless and hence have little tendency towards deterioration and rancidity hitherto found in lemon products.

In order to form lemon syrup from, for example, the lemon powder of the first example above given, which contains 21% of lemon solids and 79% of corn syrup solids, I mix two pounds of this lemon powder with six pounds of sugar and one-half gallon of water which produces one gallon of a suitable lemon syrup adapted to be employed in lemonade or for lemon flavors in the confectionery trade generally. One ounce of this lemon syrup when combined with five ounces of water makes a lemonade having a very desirable taste and aroma.

Although I specifically here example my invention with regard to the lemon fruit, it is to be understood that other citrus fruits, specifically such as orange, grapefruit, and tangerine, may be similarly combined in toto with corn syrup to produce a corresponding powder of fine flavor and aroma.

In order to prepare a powdered lemon juice, which is a modified form of my invention I take one gallon of concentrated lemon juice of about 22 Bé. weighing about 9.8 pounds per gallon and having a solids content of 3.87 pounds dry material per gallon and combine that with 21 pounds of 42 D. E. corn syrup at about 42 Bé. Corn syrup has a dry solids content of about 80%. I thoroughly mix the lemon juice and corn syrup and pour the resulting mixture to form a thin layer in a shallow pan whereupon I boil the mix under high vacuum on the order of 29 to 30 inches of mercury, in accordance with the process hereinabove set forth, until the water vapor bubbles formed within the mass expand the mass and finally break into one another to form an intercommunicating cell structure that is porous and sponge-like in form. This intercommunicating cell structure is then broken down and ground into a powder to form a lemon powder which may be employed to form beverages, flavors, concentrates and the like.

The lemon-corn syrup powder so formed is characterized by superior solubility in aqueous fluids and also by a resistance to any tendency to cake or ball which will interfere with the free flowing nature of the powder.

I have found that a lemon juice-corn syrup powder of superior flavor and aroma may be produced by adding lemon oil cold pressed from lemon peel to the lemon juice and corn syrup mix. The lemon oil improves the flavor and aroma and enhances the strength of the end products produced.

The lemon oil employed may be either terpene containing or substantially terpene free. When the terpene containing cold pressed lemon oil is employed, I use five (5) grams of cold pressed lemon oil per lemon. In other words, for each quantity of lemon juice per lemon, I add five grams of cold pressed lemon oil.

The terpenes in the lemon oil are objectionable in that they induce rancidity upon oxidation. When I distill off the terpenes of the lemon oil before adding the lemon oil to the lemon juice, I use only about .5 gram of semi-terpeneless oil per lemon. It is a feature of my invention that I may alternatively add the terpene containing cold pressed lemon oil to the lemon juice because during the process of expanding the corn syrup, lemon juice, lemon oil mixture under heat and high vacuum (about 29 inches or more), the terpenes are distilled off so that the product resulting is substantially terpene free and hence free from a tendency towards rancidity.

Alternatively I may add the lemon oil or semi-terpeneless lemon oil to the solid expanded lemon juice corn syrup mix after the expansion step, as for example, by spraying the lemon oil or semi-terpeneless lemon oil on to the expanded solid mixture of lemon juice and corn syrup. Because of the sponge like nature of this expanded mass, due to the intercommunicating cell structure, the lemon oil, which for purposes of the process is mixed with a suitable solvent such as alcohol, is sprayed on to the porous solid mass and is thoroughly absorbed internally and externally thereby. The expanded mass of lemon juice and corn syrup with the absorbed lemon oil is then crushed to particle or powder form.

A furuther modification of my invention comprises the formation of pineapple concentrates comprising pineapple solids, pineapple juice and corn syrup admixed and expanded to form a solid granular or particle material.

Although various concentrates have been made in the past from pineapple, such concentrates have always been formed from pineapple juice. I have found that by employing the pulp of pineapple itself, including both solid portions and juice of the pineapple, that I can make a product have a new and unusual pineapple flavor.

Specifically I form a solid granular product comprising a mixture of pineapple pulp and corn syrup. To form this product I first remove the rough outer skin from the pineapple and using for example, frozen crushed pineapple, I employ one hundred pounds of such frozen crushed pineapple together with one hundred and forty pounds, i. e., eleven and three-quarter gallons of 42 D. E. corn syrup. 42 D. E. corn syrup is corn syrup having a dextrose equivalent of 42 and containing 80% solids and 20% water. The pineapple and corn syrup may be either first mixed and then ground or comminuted as by means of a meat grinder, or the pineapple may be first thoroughly comminuted and thereafter mixed with the corn syrup. In either case the pineapple is thoroughly comminuted and mixed with corn syrup in substantially the proportions set forth above.

The mixture is then poured into pans in a vacuum shelf dryer and boiled under an exceptionally high vacuum of about 29 inches of mercury or more. The vapor bubbles developed within the mass by the boiling gradually become trapped in the mass as the water driven off renders the mass more viscous and finally the vapor bubbles are entrapped within the mass and expanded and finally break into one another and break at the surface to form an expanded mass. The heat and vacuum are continued until an intercommunicating cellular structure in which substantially all the cells break into one another is obtained.

The heat and vacuum then drive off and draw off the residual moisture contained therein and a thoroughly dehydrated solid mass is obtained. The mass is a heavy porous hard material and from the mixture of one hundred pounds of pineapple and one hundred and forty pounds of corn syrup, one hundred and fifteen pounds of the mix are obtained.

This relatively heavy porous cellular hard material is then ground or granulated to make a granular material similar in appearance to granulated sugar.

Because of the low moisture content of this product there is little susceptibility to balling and caking when stored en masse. Because of the inclusion of the pineapple solids carrying the pineapple pulp as well as the juice in the product, a fine pineapple flavor is obtainable from this product.

To make, for example, a pineapple beverage, I mix two teaspoons of granular material with four ounces of milk and four ounces of cracked ice and two teaspoons of sugar. When mixed in an electric mixer to a thoroughly homogeneous mass 12 ounces of a pineapple beverage are obtained, the beverage having a pineapple flavor that is far superior and closer to true pineapple flavor than that which has hitherto been produced in the art.

I claim:

1. A citrus product comprising an expanded mixture having intercommunicating cells of citrus fruit solids and corn syrup.

2. A citrus product comprising a solid expanded mixture having intercommunicating cells of citrus fruit and corn syrup.

3. A citrus product comprising a solid expanded mixture having intercommunicating cells of lemon juice, lemon oil and corn syrup.

4. A product comprising a solid expanded mixture having intercommunicating cells of pineapple pulp and corn syrup.

5. The method of forming solid dehydrated citrus product which comprises mixing edible citrus fruit materials with corn syrup, expanding the mix under heat and high vacuum, dehydrating the mix to form an expanded dehydrated cellular product having intercommunicating cells.

6. The method of forming solid dehydrated citrus product which comprises mixing edible citrus fruit solids with corn syrup, boiling and expanding the mix under high vacuum, dehydrating the mix to form an expanded dehydrated cellular product having intercommunicating cells.

7. The method of forming solid dehydrated citrus product which comprises mixing edible citrus fruit solids and juice with corn syrup, boiling and expanding the mix under high vacuum, dehydrating the mix to form an expanded dehydrated cellular product having intercommunicating cells.

8. The method of forming solid dehydrated citrus product which comprises mixing edible citrus fruit materials with corn syrup, boiling the mix under high vacuum, dehydrating the mix to form an expanded dehydrated cellular product having intercommunicating cells, and reducing the expanded product to particle size.

9. The method of forming solid dehydrated lemon juice which comprises mixing lemon juice, cold pressed lemon oil and corn syrup, boiling the mix under a high vacuum, volatilizing and substantially removing the terpenes of the lemon oil, solidifying and dehydrating the mix to form an expanded dehydrated cellular lemon juice-corn syrup product having intercommunicating cells.

10. The method of forming solid dehydrated lemon juice which comprises mixing lemon juice, and corn syrup, boiling the mix under a high vacuum, solidifying and dehydrating the mix to form an expanded dehydrated cellular lemon juice-corn syrup product having intercommunicating cells, applying cold pressed lemon oil to the expanded cellular product, the lemon oil being absorbed by the intercommunicating cell structure of the cellular product.

11. A citrus product comprising a solid expanded mixture having intercommunicating cells, said mixture comprising citrus juice and corn syrup.

12. A citrus product comprising a solid expanded mixture having intercommunicating cells, said mixture comprising citrus fruit solids, citrus juice and corn syrup.

WILBERT A. HEYMAN.